INVENTORS
SHINICHI TOMIYAMA
RINNOSUKE SUSUKI
HIROSHI HOSHI
JIRO SAITO
HIRO GOTO
KENJI UMEHARA
KEIICHI MURAKAMI

BY
Woodhams, Blanchard & Flynn
ATTORNEYS

United States Patent Office 3,739,060
Patented June 12, 1973

3,739,060
METHOD OF PREPARING CALCIUM SULFITE FOR USE AS A FILLER FOR PLASTICS
Shinichi Tomiyama, Chiba-ken, Rinnosuke Susuki, Tokyo, Hiroshi Hoshi, Chiba-ken, Jiro Saito and Hiro Goto, Tokyo, Kenji Umehara, Chiba-ken, and Keiichi Murakami, Miyagi-ken, Japan, assignors to Lion Fat & Oil Co., Ltd., Tokyo, Japan
Filed Dec. 3, 1970, Ser. No. 94,873
Claims priority, application Japan, Dec. 9, 1969, 44/98,829; Feb. 12, 1970, 45/12,092
Int. Cl. C01f 11/48
U.S. Cl. 423—512
12 Claims

ABSTRACT OF THE DISCLOSURE

A method of preparing calcium sulfite to be used as a filler for plastics, which comprises the steps of hydrating calcium oxide with water at elevated temperatures to convert it into calcium hydroxide and introducing sulfur dioxide gas into the resultant aqueous suspension of calcium hydroxide at high temperatures until the pH of the solution reach the range of 7–13.

BACKGROUND OF THE INVENTION (a) Field of the invention

The present invention relates to an improved method of preparing calcium sulfite, and, more particularly, it relates to a method of preparing calcium sulfite usable as a filler for plastics which comprises the steps of producing calcium hydroxide by putting calcium oxide in high-temperature water and subsequently introducing sulfur dioxide into the resultant aqueous suspension of calcium hydroxide at a high-temperature until the pH becomes 7–13.

(b) Description of the prior art

Calcium sulfite has hitherto been generally prepared by various means, such as: introduction of sulfur dioxide into a suspension of calcium carbonate at room temperature; blending of a sodium sulfite solution and a calcium chloride solution at low temperatures to thereby effect a double decomposition reaction; introduction of sulfur dioxide into a calcium oxide solution at a temperature below 500° C.; and partial oxidation of $CaS_2O_3$ within an alkaline solution by $H_2O_2$.

Plastic materials are not only chemically stable, superior in electric insulating property, and easy to treat, but also are available at relatively low prices steadily and in large quantities, so that they have been widely utilized. But, despite these various advantages, plastics are insufficient in such properties as sunlight resistance, thermal resistance, cold resistance, etc., and, in particular, thermoplastics such as polyolefin, polyvinyl chloride, polystyrene and the like are short of mechanical strength, namely tensile strength, hardness, rigidity, etc., adhesive property and printability in addition to the above-mentioned properties. In order to make up for these insufficient properties of the plastics, a variety of fillers are mixed therewith, and, above all, calcium sulfite has been considered superior as a filler because it is capable of providing the plastic with mechanical strength, sunlight resistance, printability, adhesive property, thermal resistance and so on. However, its performance as a filler has so far been imperfect.

Besides, calcium sulfite prepared by conventional methods as described above has the drawback that it is difficult to mix large quantities thereof with the plastic since its employment in such a fashion would impair the properties of the plastic.

SUMMARY OF THE INVENTION

The present invention has been carried out in order to overcome the shortcomings in the prior art as described above, and the principal object of the invention is to provide a method of preparing calcium sulfite with superior properties, which is capable of imparting superior sunlight resistance, thermal resistance, adhesive property, printability and mechanical strength to plastics.

Another object of the present invention is to provide calcium sulfite which can be mixed in large quantities with the plastic without impairing the intrinsic properties of the latter.

A further object of the present invention is to provide a thermoplastic resin composition which is far superior to the resin compositions filled with conventional calcium sulfites in tensile strength, tensile-shear strength, impact strength, thermal stability, chemical resistance and heat-shrinkability as well as being less expensive.

A still further object of the present invention is to provide a thermoplastic resin composition which manifests the inherent molding property of the resin.

Still another object of the present invention is to provide a thermoplastic resin composition which can be processed into a synthetic paper having a likeness to natural paper by mixing the resin with a large quantity of calcium sulfite prepared by a specified method.

An additional and special object of the present invention is to contribute a great deal to the prevention of air pollution by using noxious exhaust gases arising from petroleum refining and/or cracking in petroleum chemical industries.

The above objects of the present invention can be achieved by a process comprising the steps that calcium oxide to hydration in high-temperature water (hereinafter referred to as slaking) to convert it into calcium hydroxide and subsequently sulfur dioxide is blown into a resultant suspension of calcium hydroxide at a high temperature so as to attain the pH value in the range of 7–13, preferably in the range of 8.5–10, thereby effecting neutralization. In this connection, lower pH values tend to enlarge the particle size of the resultant calcium sulfite and are therefore unadvisable.

According to the method of the present invention, there are effected both a slaking reaction and a neutralization reaction. In both reactions, the reaction temperature is maintained above 70° C., preferably above 80° C., and more preferably in the range of 90°–100° C. As for the heating source for this occasion, the heat from the combustion of hydrogen sulfide employed as a starting material can be utilized, and this also is a feature of the present invention.

In case of employing hydrogen sulfide as a raw material for producing sulfur dioxide in the present invention, said hydrogen sulfide is not required to be chemically pure a gas comprising mainly hydrogen sulfide obtained by separating hydrocarbon from a by-product gas such as one produced by hydrogenation or thermal cracking of petroleum fractions—especially of relatively heavy fractions, that is, the exhaust gases from petroleum refining and petroleum chemical industries, can be utilized as is. Therefore, one of the characteristics of the method of preparing calcium sulfite in the present invention is that, even in case the hydrogen sulfide content in a raw material employed for producing hydrogen sulfide is rather low, it is possible to obtain a calcium sulfite having a superior filling property. This is attributable to the fact that the method of the present invention facilitates the separation and utilization of only the available component of the raw material hydrogen sulfide at the stages of subsequent combustion thereof and introduction of the resultant sulfur dioxide into a suspension of calcium hydroxide as described below. As for the means of effecting the combustion of said raw material hydrogen sulfide, any well-known means will do as long as it is possible to make the available component combine efficiently with oxygen and change to sulfur dioxide.

Sulfur dioxide gas obtained as above contains such impurities as steam and carbon dioxide gas. Such a gas containing sulfur dioxide, for example, may be obtained as an exhaust gas produced by the combustion of hydrogen sulfide from petroleum refining and/or cracking. Separation and removal of these impurities cause no inconvenience to the present invention, but such treatments are unnecessary, and, therefore, said sulfur dioxide gas can be directly introduced into a suspension of calcium hydroxide. This also is a feature of the method of preparing calcium sulfite according to the present invention in case where hydrogen sulfide is employed as a raw material.

In this connection, it also will do to mix a sulfur dioxide gas obtained by a known method, such as one obtained by the combustion of sulfur, with the foregoing sulfur dioxide.

The suspension of calcium hydroxide to be employed for the present invention is not required to be chemically pure, and its concentration is not particularly critical either. However, since the present calcium sulfite is precipitated at the time of the neutralization reaction, it is not advisable to employ a suspension of too high concentration in order to prevent calcium hydroxide from being mixed as an impurity from therein. The applicable concentration of calcium hydroxide is usually below 20%, preferably in the range of 5–20%, and the optimum range thereof is 5–15%. Further, this suspension of calcium hydroxide can also contain at least one member selected from the group consisting of water-soluble inorganic salts such as halogenides, sulfates and nitrates of sodium, potassium, calcium, magnesium and aluminum to the extent of less than 1%, preferably 0.2–5%, of the amount of said calcium hydroxide. Mixing of such substances secures the crystallizing property of the resulting calcium sulfite, whereby the efficiency of calcium sulfite as a filler—especially the surface properties thereof—can be improved.

The calcium hydroxide suspension can also contain ammonia which functions as a pH buffer or with a surface active agent which can improve the filling properties of a resin—especially a nonionic surface active agent—to the extent of 0.05–5%, and preferably 0.2–0.5%, by weight of said calcium hydroxide in the case of ammonia, 0.01–0.5%, and preferably 0.2–0.5%, by weight of the same in the case of the surface active agent. Typical nonionic surface active agents include ethoxylated aliphatic alcohol in which the aliphatic group has from 8 to 22 carbon atoms and the moles of ethylene oxide per mol of aliphatic hydrophobe is from 5 to 50 and ethoxylated alkylphenols in which the alkyl group has from 8 to 18 carbon atoms and the moles of ethylene oxide per mol of alkyl hydrophobe is from 5 to 50.

BRIEF DESCRIPTION OF THE DRAWINGS

In the appended drawings.

Hereunder will be given a further elucidation of the present invention with reference to the accompanying drawings. FIG. 1 of the drawings shows a typical reaction vat capable of effecting the slaking reaction and neutralization reaction in that order according to the present invention.

Figure 1:
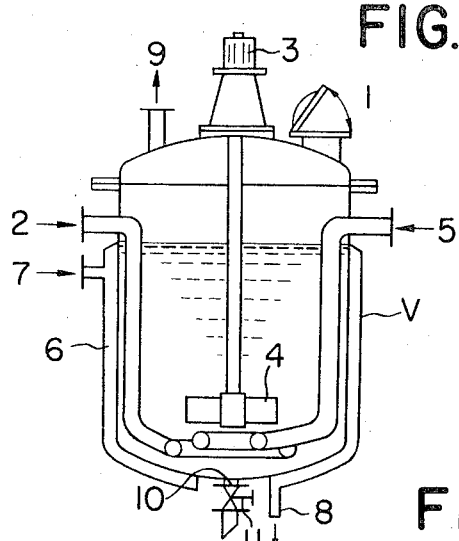
FIG. 1 is a schematic view of a reaction vat utilized in practicing the method of the present invention in a batch operation.

Calcium oxide employed as a raw material in the present invention is added to a reaction vat V by way of a inlet 1. Water and steam are introduced into the reaction vat V by way of a nozzle 2 so as to maintain the concentration of calcium oxide at 5–20 wt. percent and to maintain the temperature within the reaction vat at more than 80° C., and, at the same time, a stirrer 4 is run by the operation of, for instance, a motor 3 to mix the contents of the reaction vat V uniformly, whereby the slaking reaction is effected. After completing the slaking reaction, sulfur dioxide is introduced into the reaction vat by way of a nozzle 5 until the pH value in the reaction zone falls to in the range of 7–13, for example, 8.5, whereby calcium hydroxide resulting from the slaking reaction is neutralized. In this connection, though steam is blown into the reaction vat by way of the nozzle 2 in order to maintain the temperature in the reaction vat at more than 80° C., and preferably in the range of 90°–100° C., during the neutralization reaction too, if it is feared that the concentration of the reaction mixture within the reaction vat will be reduced excessively due to the blow-in of steam, some heat medium (such as steam, hot water, etc.) may be introduced into an external heating device such as a jacket 6 installed on the outside of the reaction vat. The spent heat medium is discharged by way of a valve (or trap, which is not necessarily provided) 8. That sulfur dioxide is introduced into the reaction vat by way of the nozzle 5 in the form of fine bubbles to facilitate the neutralization reaction and it is blown slowly (over a period of at least 20 minutes), while the inside of the reaction vat is thoroughly stirred, like in the slaking reaction so as to bring about a uniform reaction mixture. As for the rotational speed of the stirrer, in the case of turbine blades, for instance, it is advisable to rotate them at a speed of at least 3 m./sec.

The unreacted sulfur dioxide in the reaction vat is discharged from the reaction system by way of a nozzle 9 disposed at the upper part of the reaction vat together with the steam coming from the reaction system. The unreacted sulfur dioxide and steam thus discharged are cooled and/or condensed by means of a heat exchanger (which is not shown herein) and recovered as sulfur dioxide or sulfurous acid, whereby they can be recycled for use in the reaction system if needed or desired.

After effecting the neutralization reaction, the resulting suspension of calcium sulfite is taken out through an outlet 10 disposed at the bottom of the reaction vat by opening a valve 11, the calcium sulfite is separated by means of a centrifugal separator and an appropriate filter such as the one of American type, Oliver type, pressure type, etc., and dried by an appropriate drying means such as air-current drying.

Figure 2:
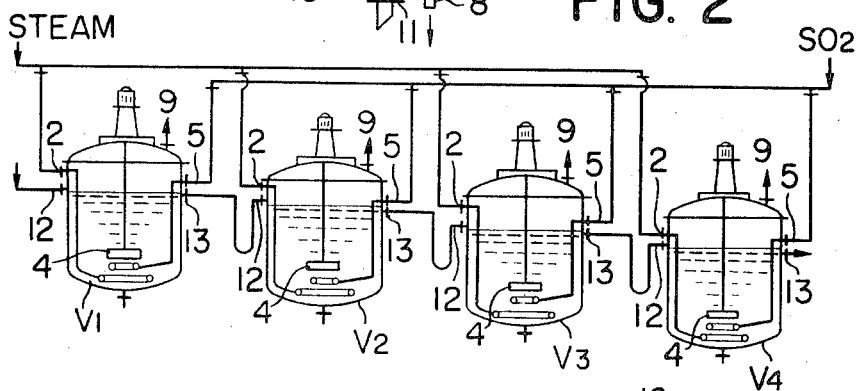
FIG. 2 is a schematic representation of apparatus utilized in practicing the present method continuously.

While the slaking reaction and neutralization reaction according to the present invention can be performed in a batch-wise operation as described above, in case of effecting said reactions continuously, it is advisable to arrange a plurality of reaction vats ($V_1 \ldots V_n$, wherein $n$ denotes an integer of more than 2 and preferably 3–4) each having the stirrer 4, feeding nozzle 12, over-flow nozzle 13, steam-blowing nozzle 2, sulfur dioxide feeding nozzle 5 and discharge nozzle 9 in serial fashion as shown in FIG. 2 so as to effect the slaking reaction and neutralization reaction successively by taking advantage of the over-flow movement of the stock.

In case of applying such a reaction system employing a plurality of reaction vats as above, the amount of sulfur dioxide to be introduced into the respective reaction vats has a very important bearing on the product coming therefrom. That is, the amount of sulfur dioxide to be introduced into the 1st reaction vat $V_1$ which is supposed to carry out the major portion of the slaking reaction is in the range of $1.3$–$1.7/n$ of the total amount of sulfur dioxide introduced which is necessary for effecting the neutralization reaction, and the remainder of said sulfur dioxide is evenly introduced into the 2d through the $n$th reaction vats. In this connection, $n$ represents the number of reaction vats.

Further, in order to obtain uniform products by mass production according to the present invention, it is naturally advantageous to adopt a cyclically continuous reaction system. Given in FIG. 3, for instance, is a schematic representation of an embodiment of this system, wherein V denotes a slaking-reaction vat provided with a calcium oxide inlet 1, hot-water introducing nozzle 2, flow-out nozzle 13, stirrer 4, etc., and P denotes a pump for applying pressure to a suspension of calcium hydroxide flowing out continuously from said slaking-reaction vat. M denotes a mixer for mixing said suspension of calcium hydroxide with sulfur dioxide, and E denotes an aging column for calcium dioxide. A denotes a suspension storage tank for the purpose of facilitating smooth operation of the pump P.

Calcium oxide is continuously fed by way of the inlet 1 into the slaking-reaction vat V filled with hot-water having a temperature above 80° C. which is introduced through the nozzle 2. The inside of the reaction vat is uniformly stirred and thereby the slaking reaction is continuously effected. Calcium hydroxide prepared within the reaction vat runs out in the form of a suspension from the flow-out nozzle 13, passes through the storage tank A, is sucked in the pump P and is pressurized, and is discharged into the mixer M. In case the mixer is of such type as an injector, sulfur dioxide is sucked into the mixer by virtue of the jet current of the suspension of calcium hydroxide, mixed with said suspension, and sent into the bottom of the aging column E. Neutralization reaction between calcium sulfite and calcium hydroxide is effected herein, and, as a result, calcium sulfite crystallizes and gradually ascends to the upper part of the aging column to be taken out from the reaction system through a flow-out nozzle 14 of said column. Insufficiently aged calcium sulfite and unreacted calcium hydroxide are sent back to the storage tank A by way of a recycle nozzle 15 of the aging column, while unreacted sulfur dioxide is sent back to the mixer M by way of a nozzle 16 fixed atop the aging column, to be recycled for use. Calcium sulfite precipitated to the bottom of the aging column as a result of excessive crystallization thereof within the column is removed from the reaction system as occasion calls by way of the discharge nozzle 17 provided at the bottom of the aging column, and is filtered and dried along with calcium sulfite removed from the reaction system by way of the flow-out nozzle fixed atop the aging column, whereby both become end products. In this connection, a nozzle 18 disposed at the bottom of the slaking-reaction vat in FIG. 3 serves for discharging the suspension of calcium hydroxide in case where the slaking reaction is discontinued and the flow-out from the nozzle 13 is no longer feasible.

The product obtained by the method of the present invention displays the superior properties as described below as a filler for plastics. The amount of the calcium sulfite to be employed as the filler is not necessarily limited, and, though the greater the amount, the better is the effect of the filling, it is usually in the range of 10–90 wt. percent, and preferably in the range of 50–80 wt. percent.

In this connection, as plastics applicable in the present invention, thermoplastic resin such as polyethylene, polypropylene, polyvinyl chloride, or copolymers or mixtures thereof, or copolymers comprising another thermoplastic resin are suitable. Besides, it is allowed to add any other conventional additive, such as plasticizer, antioxidant, colorant, viscosity improver, etc.

Calcium sulfite according to the present invention consists of fine particles like that obtained by conventional methods, and yet the former can display filling properties far superior to that of the latter as described below. The reason for this difference has not been yet clarified.

A resin composition containing mixed therein calcium sulfite according to the present invention shows a remarkable improvement in tensile strength (in case of rods and the like), tensile-shear strength (in case of sheets), impact strength, chemical resistance, heat-shrinkability (size-stability), thermal stability (color-change preventability and so on), molding and processing property as well as low cost. Especially, the calcium sulfite to be applied to the present invention is capable of being mixed in large quantities with thermoplastic resins without deteriorating the inherent properties of the latter. Besides, inasmuch as he present invention can utilize calcium sulfite obtained from the exhaust gas arising from petroleum chemical industries as the raw material therefor, which is naturally quite inexpensive, it contributes not only to a further reduction of the cost of the product, but also to the prevention of air pollution.

PREFERRED EMBODIMENTS OF THE INVENTION

Examples 1–3

Table 1 shows the comparative performances of the calcium sulfite as prepared according to the present invention (Examples 1–3), calcium sulfite prepared by the same method as that in the present invention except for modifications of the reaction temperature for the slaking reaction and the concentration of calcium oxide (Experimental Examples 1–3), calcium sulfite prepared by employing commercial calcium hydroxide as a raw material and carrying out only the neutralization reaction according to the present invention (Comparative Example 1) and calcium sulfite on the market (Comparative Example 2) as a filler for plastics.

As seen from the showings in Table 1, the calcium sulfite obtained through the slaking reaction and neutralization reaction according to the method of the present invention proved to have superior properties as a filler for plastics, while, the calcium sulfite prepared by modifying the reaction temperature at the time of the slaking reaction and the concentration of calcium oxide employed and the one prepared by commercially available calcium hydroxide were somewhat or considerably inferior to that of the present invention.

Examples 4–11

Table 2 shows comparative data of the filling properties of calcium sulfites obtained by the method of the present invention, in which the conditions in the slaking reaction and/or the neutralization reaction were varied

TABLE 1

| | Slaking-reaction condition | | Neutralization reaction condition | | | |
|---|---|---|---|---|---|---|
| | Temperature, ° C. | Concentration, percent | Temperature ° C. | Concentration, percent | Endpoint, pH | Filling properties |
| Example: | | | | | | |
| 1 | 95–100 | 5 | 95–100 | 5 | 10 | Superior. |
| 2 | 95–100 | 10 | 95–100 | 10 | 8.5 | Excellent. |
| 3 | 95–100 | 15 | 95.100 | 10 | 8.5 | Superior. |
| Experimental Example: | | | | | | |
| 1 | 95–100 | 30 | 95–100 | 10 | 8.5 | Good. |
| 2 | 95–100 | 2 | 95–100 | 2 | 10 | Do. |
| 3 | 50–60 | 10 | 95–100 | 5 | 8.5 | Do. |
| Comparative Example: | | | | | | |
| 1 | | | 95–100 | 5 | 8.5 | A little inferior. |
| 2 | | | | | | Inferior. | and/or a nonionic surface active agent or ammonia was added to the neutralization reaction system.

TABLE 2

| | Slaking-reaction conditions | | Neutralization reaction conditions | | | | | |
|---|---|---|---|---|---|---|---|---|
| | Temperature, °C. | Concentration, percent | Temperature, °C. | Concentration of calcium hydroxide | Endpoint, pH | Additive | Amount of additive | Filling properties |
| Example: | | | | | | | | |
| 4 | 70-75 | 20 | 95-100 | 5 | 13 | Nonionic surfactant.[1] | 0.2 | Superior. |
| 5 | 75-80 | 10 | 95-100 | 10 | 7 | Ammonia | 0.3 | Do. |
| 6 | 85-90 | 15 | 95-100 | 10 | 8 | | | Do. |
| 7 | 95-100 | 15 | 95-100 | 10 | 12 | Ammonia | 0.5 | Excellent. |
| 8 | 95-100 | 15 | 95-100 | 10 | 13 | Nonionic surfactant.[2] | 0.4 | Do. |
| 9 | 95-100 | 10 | 70-75 | 15 | 11 | | | Superior. |
| 10 | 95-100 | 10 | 75-80 | 20 | 9 | | | Do. |
| 11 | 95-100 | 10 | 85-90 | 10 | 10 | | | Do. |

[1] Polyoxyethylene nonylphenyl ether, polymerization degree=8.
[2] Polyoxyethylene lauryl ether, polymerization degree=18.

Examples 12–14

Table 3 shows the comparative filling-properties demonstrated by a variety of calcium sulfites prepared by applying a suspension of calcium hydroxide obtained under the most standard condition for the slaking reaction according to the present invention, namely, by subjecting 10 wt. percent of calcium oxide to the slaking reaction at a water temperature of 97±2° C., and effecting the neutralization reaction by means of introducing thereto sulfur dioxide while modifying the concentration thereof and reaction temperature variously.

factory result, it is advisable to maintain the neutralization-reaction temperature at higher than 90° C. and to limit the concentration of calcium hydroxide to the range of 5–20 wt. percent.

Examples 15–18

Table 4 shows the comparative filling-properties of calcium sulfite obtained through the neutralization reaction effected in the presence of inorganic salts and that obtained through the neutralization reaction effected in the absence of inorganic salts. In this connection, calcium

TABLE 4

| | Neutralization-reaction condition | | | | | |
|---|---|---|---|---|---|---|
| | Temperature, °C. | Concentration of calcium hydroxide, percent | Endpoint, pH | Inorganic salts mixed | Ratio of mixing with Ca(OH)$_2$ | Filling properties |
| Example: | | | | | | |
| 15 | 90-100 | 5 | 8.5 | MgCl$_2$ | 0.2 | Excellent. |
| 16 | 90-100 | 5 | 8.5 | NaCl + Na$_2$SO$_4$ | 0.5 | Do. |
| 17 | 90-100 | 5 | 8.5 | NaNO$_3$ + MgCl$_2$ | 0.5 | Do. |
| 18 | 90-100 | 5 | 8.5 | | 0 | Superior. |

TABLE 3

| | Neutralization-reaction condition | | | |
|---|---|---|---|---|
| | Temperature, °C. | Concentration, wt. percent | Endpoint, pH | Filling properties |
| Example: | | | | |
| 12 | 97±2 | 5 | 8.5 | Superior. |
| 13 | 97±2 | 10 | 8.5 | Excellent. |
| 14 | 97±2 | 20 | 8.5 | Superior. |
| Experimental Example: | | | | |
| 4 | 97±2 | 2 | 8.5 | Good. |
| 5 | 97±2 | 30 | 11.0 | Do. |
| 6 | 50±5 | 10 | 8.5 | Do. |
| Comparative Example 3 | | | | Inferior. |

In the foregoing Table 3, Experimental Examples 4 and 5 are respectively the case wherein the concentration of calcium hydroxide at the time of the neutralization reaction according to the present invention was too low and the case wherein said concentration was too high. Experimental Example 6 is the case wherein the reaction temperature was lowered. Comparative Example 3 is the case wherein calcium sulfite on the market was applied after thoroughly drying it at 120° C. for 3 hours within an air oven. As seen from these examples in Table 3, for the purpose of effecting the neutralization reaction under the present invention, in case the concentration of calcium hydroxide is below or above the range of 5–20 wt. percent and the reaction temperature is lowered, the result is not so satisfactory. That is, in order to obtain a more satishydroxide employed in these examples was prepared under the same conditions as in the foregoing Example 2.

As evident from the foregoing Table 4, the neutralization reaction according to the present invention is more effectively performed in the presence of inorganic salts.

In this context, the properties of fillers shown in Tables 1, 3 and 4 above are based on the comprehensive evaluation of the results of a variety of tests, such as the test for sunlight resistance (measured in accordance with JIS A1410–1968 corresponding to ASTM D–1435), thermal resistance (in accordance with ASTM D–1525), shear strength (in accordance with JIS P8116–1963, which corresponds to ASTM D–1922–61T), etc. conducted on the respective sheets prepared by molding a variety of compositions comprising 27 wt. percent of such a polyolefin resin as medium or low-pressure polyethylene or polypropylene, 2.5 wt. percent of ethylene-propylene rubber and 70.5 wt. percent of calcium sulfite employed in the examples, experimental examples or comparative examples shown in the foregoing tables.

Besides, every calcium sulfite employed in the examples and experimental examples in Tables 1, 3 and 4 was prepared by batch-wise operation.

The respective shear strength of these sheets was as shown in Table 5.

TABLE 5

|  | Shear strength of polyethylene sheet (g./0.2 mm.) | | Shear strength of polypropylene sheet (g./0.2 mm.) | |
| --- | --- | --- | --- | --- |
|  | Lengthwise | Crosswise | Lengthwise | Crosswise |
| Example: |  |  |  |  |
| 1 | 1,850 | 430 | 440 | 245 |
| 2 | 2,280 | 470 | 490 | 260 |
| 3 | 1,800 | 440 | 430 | 240 |
| 12 | 1,790 | 435 | 430 | 240 |
| 13 | 2,270 | 475 | 505 | 255 |
| 14 | 1,900 | 430 | 450 | 240 |
| 15 | 2,290 | 480 | 500 | 260 |
| 16 | 2,300 | 480 | 510 | 260 |
| 17 | 2,310 | 480 | 510 | 260 |
| 18 | 1,820 | 440 | 450 | 245 |
| Experimental Example: |  |  |  |  |
| 1 | 1,450 | 310 | 380 | 210 |
| 2 | 1,430 | 310 | 380 | 210 |
| 3 | 1,370 | 300 | 385 | 210 |
| 4 | 1,420 | 315 | 385 | 210 |
| 5 | 1,270 | 310 | 380 | 215 |
| 6 | 1,010 | 310 | 340 | 210 |
| Comparative Example: |  |  |  |  |
| 1 | 800 | 260 | 230 | 190 |
| 2, 3 | 360 | 150 | 280 | 140 |

Examples 19–20

Figure 3:
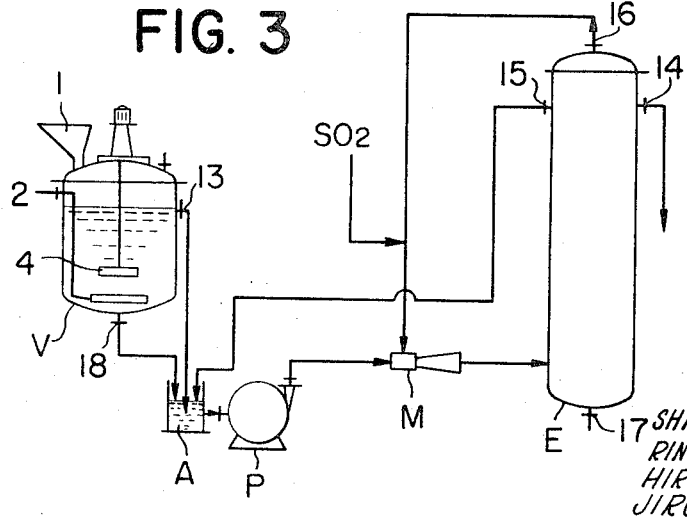
FIG. 3 is a schematic representation of cyclic-process continuous reaction apparatus utilized in practicing the same cyclically and continuously.

Calcium sulfite obtained by employing an apparatus comprising 3 reaction vats in serial arrangement as shown in FIG. 2 (hereinafter referred to as Example 19) and calcium sulfite obtained employing an apparatus as shown in FIG. 3 (hereinafter referred to as Example 20) were respectively mixed with polyethylene or polypropylene in the same way and at the same rate as in the foregoing, and molded into sheets respectively. The respective shear strength of these sheets were as shown in Table 6.

In this connection, the reaction conditions in the method of preparing the foregoing calcium sulfites were the same as that of Example 16.

TABLE 6

|  | Shear strength of polyethylene sheet (g./0.2 mm.) | | Shear strength of polypropylene sheet (g./0.2 mm.) | |
| --- | --- | --- | --- | --- |
|  | Lengthwise | Crosswise | Lengthwise | Crosswise |
| Example: |  |  |  |  |
| 19 | 2,600 | 520 | 520 | 300 |
| 20 | 2,700 | 530 | 580 | 320 |
| 16 | 2,300 | 480 | 510 | 260 |

Showings in Table 6 indicate that the continuous operation or cyclic-process continuous operation is preferable to the batchwise operation in effecting the reactions.

Example 21

Hydrogen sulfide generated by causing dilute hydrochloric acid to act on iron sulfide was burnt in air, whereby a gas containing sulfur dioxide was obtained, and then the concentration of said sulfur dioxide was adjusted to be 8% by volume. Meanwhile, an aqueous suspension of calcium hydroxide (which was prepared under the same reaction condition as that of Example 1) having a concentration of 5 wt. percent was prepared. Subsequently, while heating this aqueous suspension to boiling, the foregoing gas containing sulfur dioxide was blown therein till the pH value reached to 8.5, and the calcium sulfite produced thereby was filtered and dried. This calcium sulfite was composed of 99.8% of $CaSO_3 \cdot \frac{1}{2}H_2O$ and 0.2% of $Ca(OH)_2$.

Next, calcium sulfite thus prepared was mixed with the respective thermoplastic resins shown in the following Table 7, whereby there were obtained the desired compositions. These compositions were then respectively molded into a 0.2 mm.-thick sheets, and, meanwhile, another calcium sulfide, which was prepared by following the process in the present example except for the employment of sulfur in place of hydrogen sulfite employed for the present example, was molded into a sheet of same fashion. The results of the tests conducted on these sheets for their performances were as shown in Table 7.

TABLE 7

| | Resin | | | | | | | | | | |
| --- | --- | --- | --- | --- | --- | --- | --- | --- | --- | --- | --- |
| | Polyethylene (amount filled) | | | | | | Polypropylene (amount filled) | | Polyvinyl chloride (amount filled) [5] | | | |
| | 70 wt. percent | | 75 wt. percent | | 80 wt. percent | | 60 wt. percent | | 70 wt. percent | | 75 wt. percent | |
| Filler | Present invention | Contrast | Present invention | Contrast | Present invention | Contrast | Present invention | Contrast | Present invention | Contrast | Present invention | Contrast |
| Tensile strength (kg./cm.²) | 313 | 298 | 270 | 240 | 202 | 196 | 372 | 360 | 201 | 192 | 248 | 230 |
| Age resistance (kg./cm.²) [1] | 308 | 240 | 261 | 224 | 201 | 191 | 368 | 351 | 191 | 186 | 244 | 224 |
| Alkali resistance (kg./cm.²) [2] | 298 | 280 | 239 | 230 | 186 | 186 | 361 | 348 | 186 | 179 | 241 | 196 |
| Shrinkability and deformability (percent) [3] | 3.2 | 3.6 | 2.9 | 3.1 | 2.7 | 2.8 | 8.2 | 8.9 | 7.3 | 7.4 | 3.6 | 3.8 |
| Workability [4] | 100 | 80 | 100 | 70 | 100 | 60 | 100 | 80 | 100 | 60 | 100 | 80 |

[1] Tensile strength after the test sheet was left standing for 50 hours within an air oven at a temperature of 120±5° C. Method of measurement of the tensile strength was in accordance with ASTM D-638-67J.
[2] Tensile strength after the test sheet was dipped in 30%-aqueous solution of caustic soda for 7 days.
[3] Change in area of the test sheet after it was left standing for 2 hours within an air oven at a temperature of 120±5° C.
[4] The workability indicates relative time on the basis of 100 of a blend prepared by blending the resin with the filler of the present invention. The blending is carried out to obtain a uniform blend, by placing the mixture between two rolls of 89 mm. in diameter and 200 mm. in length each, a ratio of r.p.m. of 1.2, a temperature of 160±5° C., and a roll clearance of 1.8 mm. The longer the blending time is, the more the workability value is lowered.
[5] Compositions employing polyvinyl chloride were as follows:

| | | | |
| --- | --- | --- | --- |
| Polyvinyl chloride, percent | 30 | 20 | 15 |
| Dioctyl phthalate, percent | 8 | 6 | 4 |
| Lead stearate, percent | 2 | 4 | 6 |
| Calcium sulfite, percent | 60 | 70 | 75 |

Example 22

A raw material gas obtained through the hydrogenation reaction of heavy oil and composed of

| | Percent by volume |
| --- | --- |
| Hydrogen sulfide | 48 |
| Carbon dioxide | 51 |
| Hydrocarbon (having 1–3 carbon atoms) | 1 | was mixed with air at a rate of 9 parts by volume of air per 1 part by volume of hydrogen sulfide contained in said material gas, and was burnt. The gas thus burnt was introduced into a suspension of calcium hydroxide having a temperature of about 100° C., which was prepared by putting calcium oxide in hot water having a temperature of 90° C., till the whole calcium hydroxide completely turned into calcium sulfite, whereby there was obtained calcium sulfite. This calcium sulfite, when dehydrated and dried, had a particle size of 1–10μ. By means of filling 70 parts by weight of this product in 30 parts by weight each of the thermoplastic resins shown in Table 8, a variety of compositions as intended were prepared. These compositions were then respectively molded into 1 mm.-thick sheets. The results of a series of tests conducted on these sheets were as shown in Table 8.

TABLE 8

|  | Present invention | | |
| --- | --- | --- | --- |
|  | Poly-ethylene | Poly-propylene | Polyvinyl chloride |
| Tensile strength (kg./cm.²) | 313 | 287 | 254 |
| Age resistance (kg./cm.²) | 308 | 270 | 200 |
| Alkali resistance (kg./cm.²) | 297 | 285 | 220 |
| Shrinkability and deformability (percent) | 4.9 | 5.1 | 7.3 |
| Electric resistance (Ω/cm.) | >10¹⁶ | >10¹⁶ | >10¹⁶ |

Example 23

The calcium sulfite prepared in Example 22 was filled to the extent of 30–70 wt. percent in a commercially available medium- or low-pressure polyethylene and formed into a cup, 70 mm. in height, 200 cc. in capacity and 1.5 mm. in thickness, by injection-molding.

Molding condition:
  Molding machine: 3-oz. plunger-type injection-molding machine
  Injection pressure: 30 kg./cm.²
  Temperature of cylinder: 210° C., 220° C., 240° C.
  Cycle time: 18 sec.

This cup was laid upside down on a concrete floor, and a steel ball weighing 500 g. was dropped on the cup, to thereby measure the altitude high enough to make the steel ball dropped therefrom destroy the cup. For the sake of comparison, another cup prepared by employing, as a filler, calcium sulfite obtained from sulfur dioxide arising from the combustion of sulfur, was subjected to the same test as above.

TABLE 9

|  | In case medium/low-pressure polyethylene (A) was used | | In case medium/low-pressure polyethylene (B) was used | |
| --- | --- | --- | --- | --- |
|  | Present invention (cm.) | Comparative product (cm.) | Present invention (cm.) | Comparative product (cm.) |
| Amount of calcium sulfite used for mixing (percent): | | | | |
| 30 | 120 | 120 | 140 | 130 |
| 40 | 100 | 100 | 100 | 100 |
| 50 | 60 | 50 | 80 | 70 |
| 60 | 50 | 20 | 50 | 30 |
| 70 | 20 | 15 | 30 | 20 |

NOTE.—(A) Indicates a polyethylene whose mean molecular weight is 65,000, and melt index 6.5. (B) Indicates a polyethylene whose mean molecular weight is 75,000, and melt index 3.0.

What we claim is:

1. A method of preparing calcium sulfite for use as a filler in a moldable plastic composition for imparting thereto superior properties of sunlight resistance, thermal resistance, adhesiveness, printability and mechanical strength, which comprises adding from 5 to less than 20 percent by weight of calcium oxide to water continuously maintained at a temperature of higher than 80° C., thereby to effect a hydration reaction to obtain a suspension of calcium hydroxide in water, said suspension containing from 5 to less than 20 percent by weight of calcium hydroxide,
  mixing said suspension maintained at a temperature of higher than 80° C., with sulfur dioxide gas, until the pH of the suspension is in the range of from 8.5 to 10, thereby to effect a neutralization reaction to obtain a suspension of calcium sulfite in water, and then recovering calcium sulfite from said suspension.

2. A method according to claim 1, wherein the reaction temperature at the time of both the hydration reaction and the neutralization reaction is in the range of 90–100° C.

3. A method according to claim 1, wherein said gas containing sulfur dioxide is prepared by combustion of a gas containing hydrogen sulfide.

4. A method according to claim 3, wherein said gas containing hydrogen sulfide is an exhaust gas from petroleum refining or cracking processing.

5. A method according to claim 1, wherein the concentration of calcium oxide is in the range of 5–15 wt. percent.

6. A method according to claim 5, wherein the concentration of calcium hydroxide in the suspension formed by the hydration reaction is in the range of 5–15 wt. percent.

7. A method according to claim 1, wherein the neutralization reaction is effected in the presence of inorganic salt selected from the group consisting of halogenides, sulfates and nitrates of metals selected from the group consisting of sodium, potassium, calcium, magnesium and aluminum, and mixtures of said salts the amount of said inorganic salt being from 0.2–0.5 wt. percent, based on the weight of calcium hydroxide.

8. A method according to claim 1, wherein the neutralization reaction of calcium hydroxide is effected in the presence of a nonionic surface active agent, the amount of said nonionic surface active agent being from 0.01–0.5 wt. percent, based on the weight of calcium hydroxide.

9. A method according to claim 1, wherein the neutralization reaction of calcium hydroxide is effected in the presence of ammonia, the amount of ammonia being from 0.05–5 wt. percent, based on the weight of calicum hydroxide.

10. A method according to claim 1, in which the neutralization reaction is effected by continuously flowing the reaction product of the hydration reaction in series through a plurality of reaction vessels and in each reaction vessel mixing the suspension with sulfur dioxide gas to effect partial neutralization thereof, the neutralization reaction being completed in the last reaction vessel of the series.

11. A method according to claim 10, wherein the amount of sulfur dioxide initially introduced into the first reaction vessel is in the range of $1.3$–$1.7/n$, wherein $n$ is an integer of more than 2 and corresponding to the number of the reaction vessels, of the total amount of sulfur dioxide to be introduced and the remainder of said sulfur dioxide is introduced evenly into the remaining reaction vessels.

12. A method according to claim 1, in which the hydration reaction is carried out in a first reaction vessel, the reaction product of the hydration reaction is pumped through a mixing device wherein it is mixed with said sulfur dioxide gas and then is flowed into a second vessel in which the neutralization reaction is completed.

References Cited

UNITED STATES PATENTS

| 1,984,188 | 12/1934 | Haywood | 23—129 X |
| 2,269,608 | 1/1942 | Strieby | 23—129 |
| 1,678,630 | 7/1928 | Bähr | 23—177 R |
| 3,577,219 | 5/1971 | Shah | 23—129 |
| 2,154,996 | 4/1939 | Rawling | 23—129 X |
| 2,004,799 | 6/1935 | Richardson | 23—129 |

OTHER REFERENCES

International Sugar Journal, vol. 28, pp. 36–45 (1926).

EDWARD STERN, Primary Examiner

U.S. Cl. X.R.

260—41; 423—158, 164